No. 734,075. PATENTED JULY 21, 1903.
A. C. LIFQUIST.
CREAM COOLER AND AERATOR.
APPLICATION FILED AUG. 26, 1902.
NO MODEL.
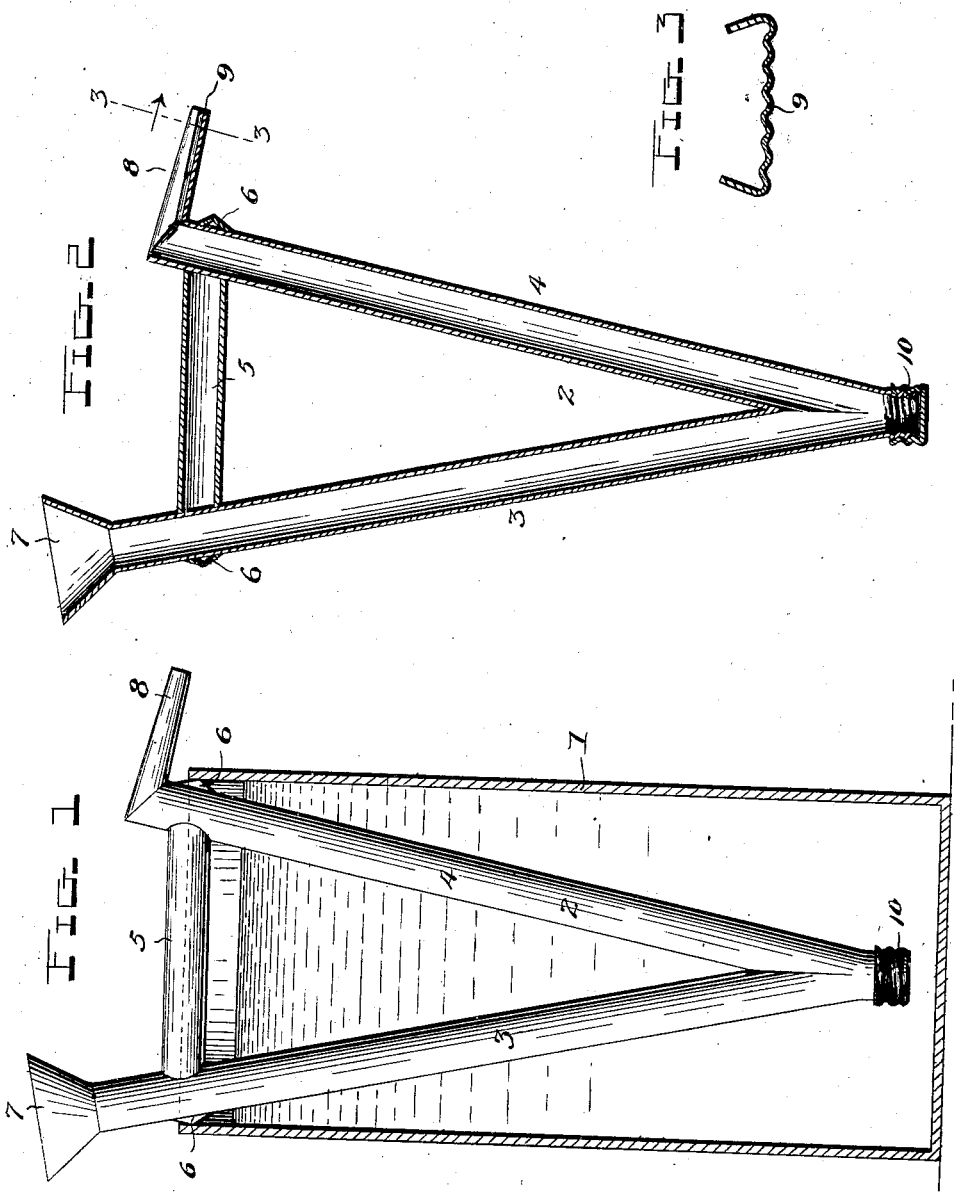
Inventor
A. C. Lifquist
Witnesses No. 734,075.

Patented July 21, 1903.

UNITED STATES PATENT OFFICE.

ANDREW C. LIFQUIST, OF WADENA, MINNESOTA.

CREAM COOLER AND AERATOR.

SPECIFICATION forming part of Letters Patent No. 734,075, dated July 21, 1903.

Application filed August 26, 1902. Serial No. 121,075. (No model.)

*To all whom it may concern:*

Be it known that I, ANDREW C. LIFQUIST, a citizen of the United States, residing at Wadena, in the county of Wadena and State of Minnesota, have invented certain new and useful Improvements in Cream Coolers and Aerators; and I do declare the following to be a full, clear, and exact description of the invention, such as will enable others skilled in the art to which it appertains to make and use the same.

The invention relates to coolers and aerators for cream and milk.

The object of the invention is to produce a device of this character which is simple in construction, inexpensive of production, durable in use, and efficient in operation.

With the above and other objects in view, which will readily appear as the nature of the invention is better understood, said invention consists in certain novel features of construction and combination and arrangement of parts, which will be hereinafter fully described and claimed, and illustrated in the accompanying drawings, in which—

Figure 1 is a sectional view through a can or vessel, showing the application of my invention, the cooler and aerator being in side elevation. Fig. 2 is a vertical sectional view through the cooler and aerator, and Fig. 3 is a detail cross-sectional view taken on the line 3 3 of Fig. 2 through the discharge-spout.

Referring more particularly to the drawings, the numeral 1 denotes a deep can or tank of any description adapted to contain the cooling medium, which is preferably ice-water, and 2 denotes my cooler and aerator, which is adapted to set in said cooling medium.

The cooler comprises two tubes 3 and 4, which are united at their lower end and have their diverging upper ends secured together by the brace 5. The stops or lugs 6 upon said tubes adjacent to their upper ends engage the top of the can or vessel 1 and hold the cooler down in the water. Formed upon the top of the tube 3 is a filling-funnel 7, through which the cream or milk is fed into the tube 3. The upper end of the tube 4 is formed with a discharge-spout 8, which is arranged at right angles to the said tube and has a flattened and flaring mouth, the bottom of which is corrugated, as shown at 9, to separate and spread the cream into small jets or sprays as it leaves the same. The lower ends of the tubes are united to form a single tube, which is closed by the screw-cap 10, which may be removed when it is desired to clean the cooler.

In the operation of the device the tubes are inserted in the cooling medium in the can or tank, and the cream or milk is poured into the funnel 7 and passes down tube 3, up tube 4, and out through the discharge-spout 8. The milk is cooled as it passes through the tubes, and when it leaves the discharge-spout 8 the corrugations 9 upon the bottom of the same will divide or separate it into small streams or sprays in order that it may be aerated as it falls into a can or receptacle placed below.

It will be observed by reference to the drawings that the tubes 3 4 are perfectly straight, that the upper end of each of them is open, the discharge-spout 9 not being covered and the funnel 7 not obstructing the upper end of the tube 3, and that the opening at the lower ends of the two tubes is common to both of them. This construction is of material advantage and greatly facilitates the cleaning of the device by enabling a swab or cloth to be readily drawn through the tubes when the closure 10 has been removed. Furthermore, the tubes converge downwardly, so that the device is wedge-shaped, which greatly facilitates its engagement with the sides of a vessel in which it is or may be inserted when in use.

From the foregoing description, taken in connection with the accompanying drawings, it is thought that the construction, operation, and advantages of my improved cream cooler and aerator will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A cooler and aerator of the class described comprising a pair of downwardly-converging straight tubes open and uniting at their lower ends and having a closure therefor, common to both of them, one of said tubes having a funnel at its upper end and the other having at its upper end a corrugated discharge-spout which is open on its upper side for the purpose set forth, substantially as described.

In testimony whereof I have hereunto set my hand in presence of two subscribing witnesses.

ANDREW C. LIFQUIST.

Witnesses:
F. T. LOTTO,
W. E. PARKER.